US008811756B2

(12) United States Patent
Rodriguez et al.

(10) Patent No.: US 8,811,756 B2
(45) Date of Patent: Aug. 19, 2014

(54) IMAGE COMPRESSION

(75) Inventors: Adrian X. Rodriguez, Durham, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 13/179,597

(22) Filed: Jul. 11, 2011

(65) Prior Publication Data

US 2013/0016917 A1  Jan. 17, 2013

(51) Int. Cl.
*G06K 9/36* (2006.01)

(52) U.S. Cl.
USPC ........................................... 382/232

(58) Field of Classification Search
USPC .......... 382/232, 236, 238–239, 305; 345/555; 348/390.1; 375/240.11, 240.12
See application file for complete search history.

(56) References Cited

U.S. PATENT DOCUMENTS

| | | | |
|---|---|---|---|
| 5,179,651 A * | 1/1993 | Taaffe et al. | 345/555 |
| 5,841,473 A * | 11/1998 | Chui et al. | 348/390.1 |
| 5,983,251 A | 11/1999 | Martens et al. | |
| 6,310,974 B1 | 10/2001 | Persiantsev et al. | |
| 6,556,718 B1 | 4/2003 | Piccinelli et al. | |
| 6,674,391 B2 * | 1/2004 | Ruszkowski, Jr. | 342/169 |
| 6,757,429 B2 | 6/2004 | Hu | |
| 6,795,585 B1 | 9/2004 | Parada et al. | |
| 6,823,015 B2 | 11/2004 | Hall et al. | |
| 7,142,721 B2 | 11/2006 | Chen et al. | |
| 7,170,941 B2 | 1/2007 | Shives et al. | |
| 7,212,676 B2 | 5/2007 | Dwyer et al. | |
| 7,266,150 B2 | 9/2007 | Demos | |
| 7,356,679 B1 | 4/2008 | Le et al. | |
| 7,773,815 B2 | 8/2010 | Shen et al. | |
| 7,805,024 B2 * | 9/2010 | Wu | 382/305 |
| 2004/0152455 A1 | 8/2004 | Herle | |
| 2005/0172196 A1 | 8/2005 | Osecky et al. | |
| 2006/0203906 A1 | 9/2006 | Divorra Escoda et al. | |
| 2007/0296814 A1 | 12/2007 | Cooper et al. | |

FOREIGN PATENT DOCUMENTS

WO    WO 2008000451 A1  *  1/2008

OTHER PUBLICATIONS

International Telecommunication Union, CCITT The International Telegraph and Telephone Consultative Committee, Terminal Equipment and Protocols for Telematic Services, Information Technology—Digital Compression and Coding of Continuous-Tone Still Images—Requirements and Guidelines, ISO/IEC 10918-1 ITU-T Recommendation T.81, ITU 1993, CCITT Rec. T.81 (1992 E), pp. 1-186. (All Pages).

\* cited by examiner

*Primary Examiner* — Duy M Dang
(74) *Attorney, Agent, or Firm* — Edward J. Lenart; Katherine S. Brown; Biggers Kennedy Lenart Spraggins LLP

(57) ABSTRACT

Methods, apparatuses, and computer program products for image compression are provided. Embodiments include: examining, by an image controller, contextual data of a plurality of uncompressed images; selecting from the plurality of uncompressed images, by the image controller, a group of uncompressed images that have related contextual data; designating, by the image controller, one of the selected images to be a reference image; creating, by the image controller, delta images, each delta image representing differences between the reference image and one of the uncompressed images; and compressing and storing, by the image controller, the reference image and each of the delta images.

20 Claims, 5 Drawing Sheets

IMAGE COMPRESSION

BACKGROUND OF THE INVENTION

1. Field of the Invention

The field of the invention is data processing, or, more specifically, methods, apparatuses, and computer program products for image compression.

2. Description of Related Art

Photographers often take multiple pictures of the same scene or similar scenes. In this collection of pictures, the individual images may include characteristics that are identical. For example, at particular pixel location in multiple images, a pixel may have the same brightness and color. However, even if the images include many areas with identical pixel information, storing each image in the collection may occupy vast amounts of storage space.

SUMMARY OF THE INVENTION

Methods, apparatuses, and computer program products for image compression are provided. Embodiments include: examining, by an image controller, contextual data of a plurality of uncompressed images; selecting from the plurality of uncompressed images, by the image controller, a group of uncompressed images that have related contextual data; designating, by the image controller, one of the selected images to be a reference image; creating, by the image controller, delta images, each delta image representing differences between the reference image and one of the uncompressed images; and compressing and storing, by the image controller, the reference image and each of the delta images. By using contextual data to identify images that may have similar pixel data, images that could possibly benefit from delta image compression may be identified. Using delta image compression that stores the differences between the images instead of storing the entire image reduces the amount of storage space required to store a collection of similar images.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
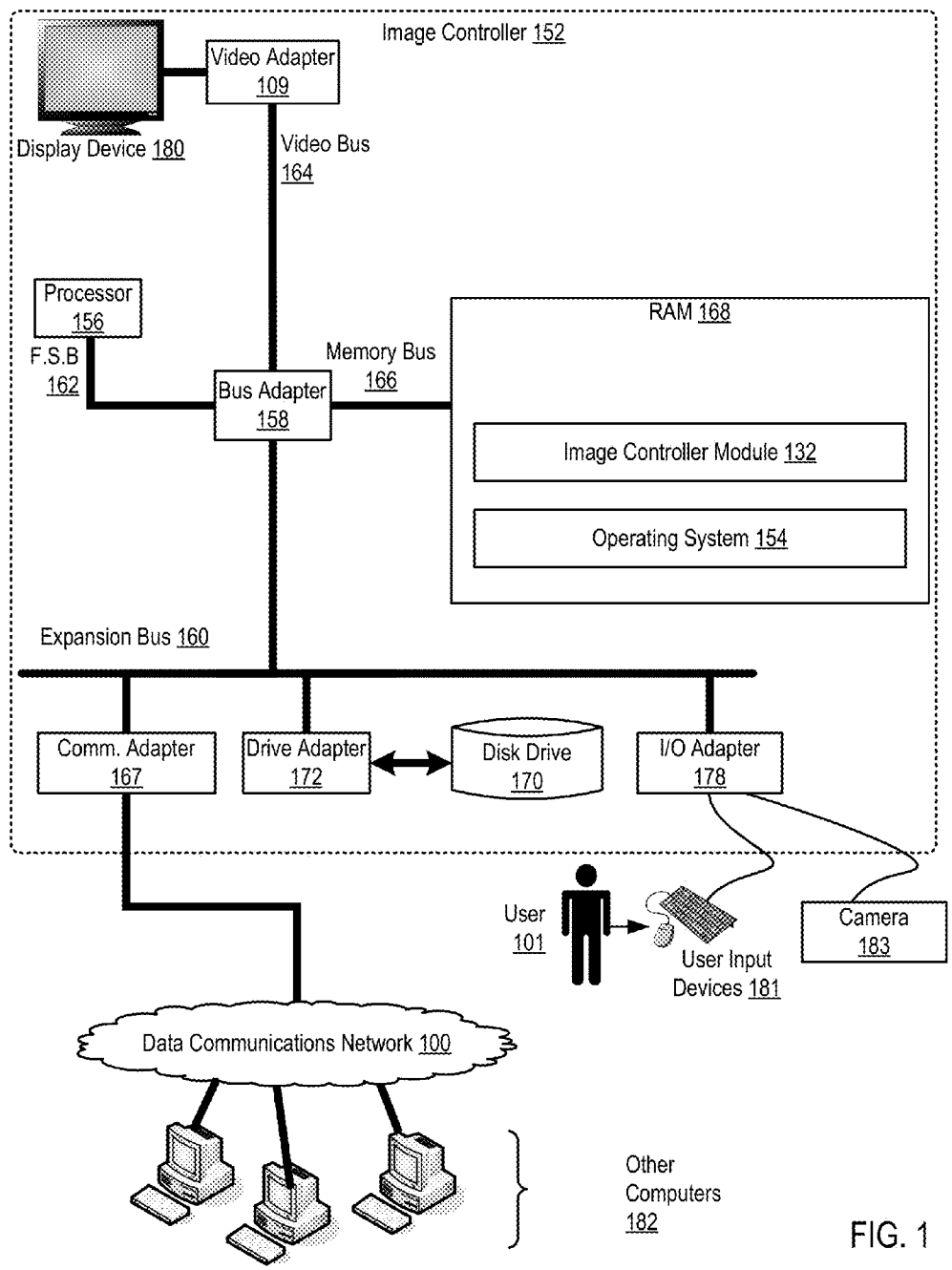
FIG. 1 sets forth a block diagram of automated computing machinery comprising an exemplary image controller useful in image compression according to embodiments of the present invention FIG. 2 sets forth a flow chart illustrating an exemplary method for image compression according to embodiments of the present invention.

Exemplary methods, apparatus, and products for image compression in accordance with the present invention are described with reference to the accompanying drawings, beginning with FIG. 1. Image compression in accordance with the present invention is generally implemented with computers, that is, with automated computing machinery. FIG. 1 sets forth a block diagram of automated computing machinery comprising an exemplary image controller (152) useful in image compression according to embodiments of the present invention. The image controller (152) of FIG. 1 includes at least one computer processor (156) or 'CPU' as well as random access memory (168) ('RAM') which is connected through a high speed memory bus (166) and bus adapter (158) to processor (156) and to other components of the image controller (152). An image controller may be any device that is used for compression and storage of images. For example, the image controller (152) may be a mobile electronic device, such as a phone, handheld camera, or a personal digital assistant (PDA). An image controller may also include mechanisms for capturing contextual elements, such as global positioning system (GPS) coordinates or accelerometer readings.

Stored in RAM (168) is an image controller module (132) that includes computer program instructions for image compression. The image controller module (132) includes computer program instructions that when executed by the processor (156) cause the processor to examine contextual data of a plurality of uncompressed images; select from the plurality of uncompressed images a group of uncompressed images that have related contextual data; designate one of the selected images to be a reference image; create delta images, each delta image representing differences between the reference image and one of the uncompressed images; and compress and store the reference image and each of the delta images.

Also stored in RAM (168) is an operating system (154). Operating systems useful image compression according to embodiments of the present invention include UNIX™, Linux™, Microsoft 7™, AIX™, IBM's i5/OS™, iOS™, Android™, and others as will occur to those of skill in the art. The operating system (154) and the image controller module (132) in the example of FIG. 1 are shown in RAM (168), but many components of such software typically are stored in non-volatile memory also, such as, for example, on a disk drive (170).

The image controller (152) of FIG. 1 includes disk drive adapter (172) coupled through expansion bus (160) and bus adapter (158) to processor (156) and other components of the image controller (152). Disk drive adapter (172) connects non-volatile data storage to the image controller (152) in the form of disk drive (170). Disk drive adapters useful in computers for image compression according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art. For example, uncompressed images may be stored on the disk drive (170) or on other types of data storage and the image controller (152) may retrieve the uncompressed images from those devices.

The example image controller (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The I/O adapter (178) is configured to communicate with a camera (183). The camera (183) of FIG. 1 may be a source for providing uncompressed images to the image controller (152). One or more additional cameras or other types of devices may be coupled to the I/O adapter (178) to provide uncompressed images to the image controller (152).

The example image controller (152) of FIG. 1 includes a video adapter (109), which is an example of an I/O adapter specially designed for graphic output to a display device (180) such as a display screen or computer monitor. Video adapter (109) is connected to processor (156) through a high speed video bus (164), bus adapter (158), and the front side bus (162), which is also a high speed bus.

The exemplary image controller (152) of FIG. 1 includes a communications adapter (167) for data communications with other computers (182) and for data communications with a data communications network (100). The image controller module (132) of FIG. 1 may also receive uncompressed images from sources via the data communication network (100) or from the other computers (182). For example, additional cameras, storage devices, and any other type of device that captures or stores uncompressed images may act as a source that provides uncompressed images to the image controller (152). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for image compression according to embodiments of the present invention include modems for wired dial-up communications, Ethernet (IEEE 802.3) adapters for wired data communications network communications, and 802.11 adapters for wireless data communications network communications.

Figure 2:
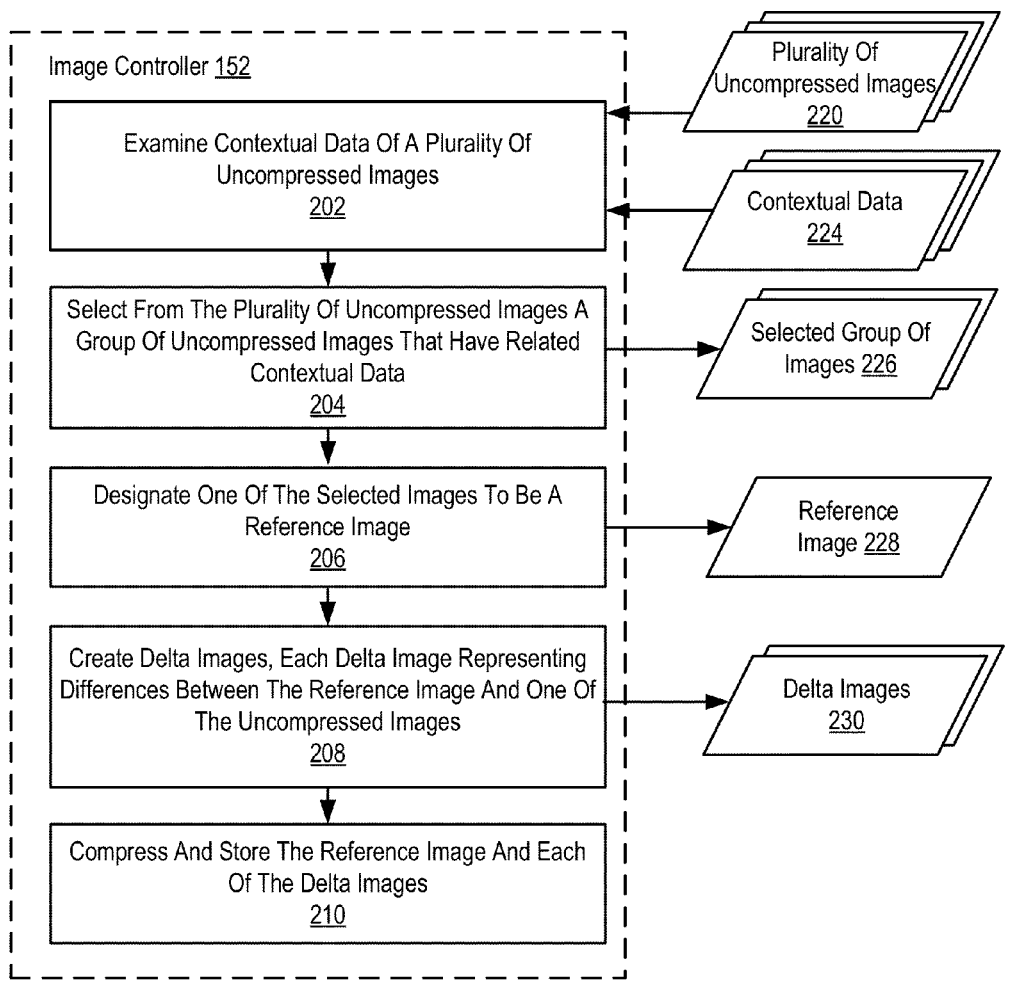

For further explanation, FIG. 2 sets forth a flow chart illustrating an exemplary method for image compression according to embodiments of the present invention. The method of FIG. 2 includes examining (202), by an image controller (152), contextual data (224) of a plurality (220) of uncompressed images. Contextual data is anything that can identify a specific location. For example, contextual data may include global positioning system (GPS) coordinates, WiFi signals, cell phone triangulation, hot spots, application information (such as checkin in with social networking websites), and others as will occur to readers of skill in the art.

The contextual data for a particular image may be encoded as metadata with the particular image when the particular image is captured. For example, a camera that captures an image may also record the global positioning system (GPS) coordinates of the camera at the time that the image was captured. In this example, the camera may also record and store within the image, a time and date stamp indicating when the image was captured. An image controller may use time and date stamps in addition to the contextual data for image compression according to embodiments of the present invention. Additional contextual data may also be stored, such as a compass heading of the camera.

The contextual data may be organized with fields. Each field may indicate a particular type of contextual data. For example, a first field may correspond to GPS coordinates and a second field may be a compass heading. Examining (202) contextual data (224) of a plurality (220) of uncompressed images may be carried out by determining which fields are available within the contextual data of the plurality (220) of uncompressed images; determining which fields of the contextual data to compare; and comparing one of more fields of the contextual data of the plurality (220) of uncompressed images to determine which uncompressed images within the plurality (220) match.

The method of FIG. 2 includes selecting (204) from the plurality (220) of uncompressed images, by the image controller (152), a group (226) of uncompressed images that have related contextual data. Selecting (204) from the plurality (220) of uncompressed images a group (226) of uncompressed images that have related contextual data may be carried out by identifying which uncompressed images within the plurality (220) of uncompressed images have contextual data that matches; and grouping the matching uncompressed images into a group. Related contextual data may include one or more fields that are substantially similar.

The method of FIG. 2 includes designating (206), by the image controller (152), one of the selected images to be a reference image (228). A reference image may be considered a master image against which all of the other images within the group (226) of uncompressed images are compared. Designating (206) one of the selected images to be a reference image (228) may be carried out by storing indications of the characteristics of the reference image (228) within the image controller (152). Characteristics of the reference image (228) may include pixel information, such as color, brightness, and other as will occur to readers of skill in the art.

The method of FIG. 2 includes creating (208), by the image controller (152), delta images (230). Each delta image represents differences between the reference image (228) and one of the uncompressed images. For example, a delta image may be a comparison between the reference image (228) and an uncompressed image. In this example, if the difference between the two images is four pixel changes then the four pixel changes may be recorded as the delta image. Creating (208) delta images (230) may be carried out by determining for a particular uncompressed image the differences between the particular uncompressed image and the reference image (228); and storing the differences as a delta image.

The method of FIG. 2 includes compressing and storing (210), by the image controller (152), the reference image (228) and each of the delta images (230). Compressing and storing (210) the reference image (228) and each of the delta images (230) may be carried out by storing the reference image and the delta images in one or more digital image files; and compressing the stored digital image files. Compressing the stored digital image files may include performing a type of spatial image compression, or other type of compression that will occur to readers of skill in the art. By using contextual data to identify images that may have similar pixel data, images that could possibly benefit from delta image compression may be identified. Using delta image compression that stores the differences between the images instead of storing the entire image reduces the amount of storage space required to store a collection of similar images.

Figure 3:
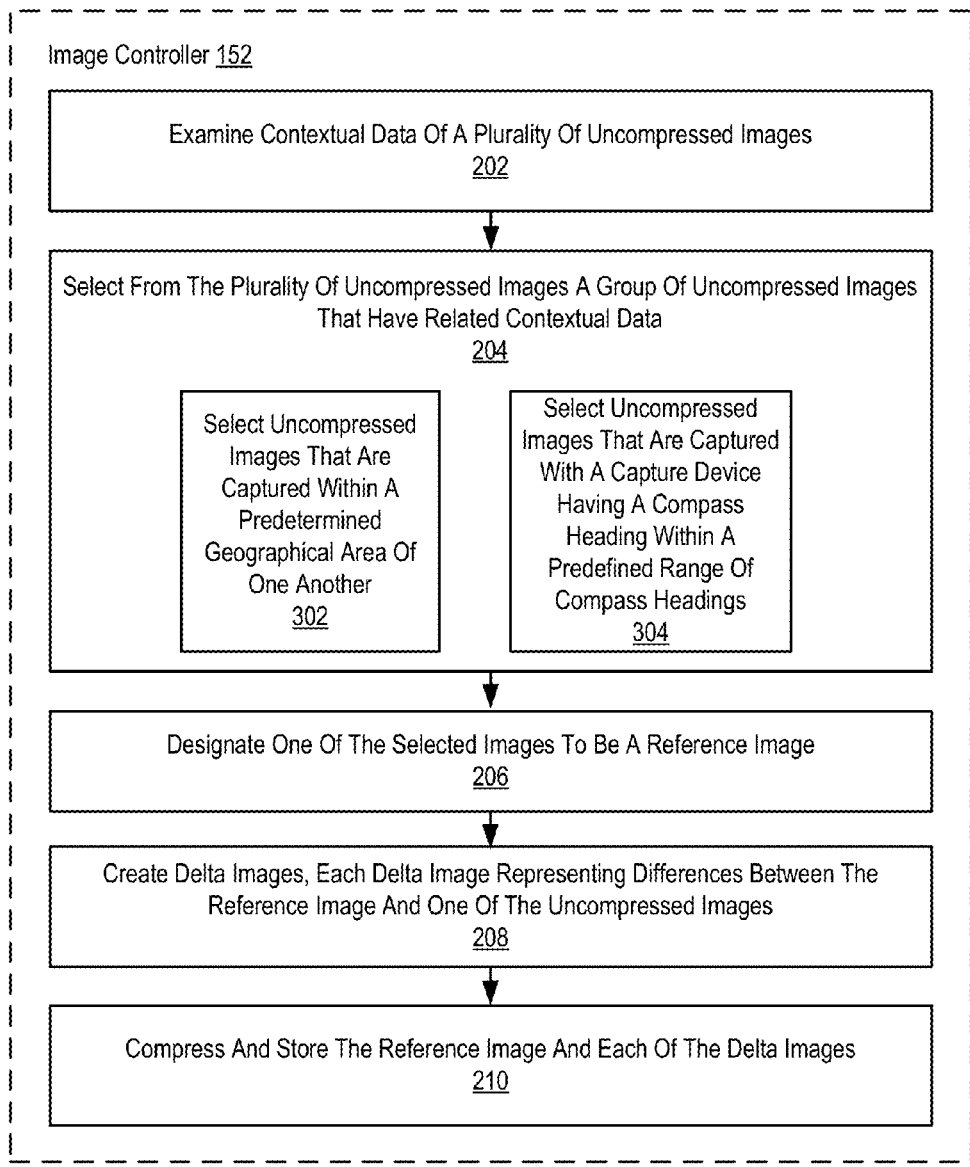
FIG. 3 sets forth a flow chart illustrating a further exemplary method for image compression according to embodiments of the present invention.

For further explanation, FIG. 3 sets forth a flow chart illustrating a further exemplary method for image compression according to embodiments of the present invention. The method of FIG. 3 is similar to the method of FIG. 2 in that the method of FIG. 3 includes: examining (202), by an image controller (152), contextual data (224) of a plurality (220) of uncompressed images; selecting (204) from the plurality (220) of uncompressed images, by the image controller (152), a group (226) of uncompressed images that have related contextual data; designating (206), by the image controller (152), one of the selected images to be a reference image (228);

creating (208), by the image controller (152), delta images (230); and compressing and storing (210), by the image controller (152), the reference image (228) and each of the delta images (230).

In the method of FIG. 3, selecting (204) from the plurality (220) of uncompressed images a group (226) of uncompressed images that have related contextual data includes selecting (302) uncompressed images that are captured within a predetermined geographical area of each other. Selecting (302) uncompressed images that are captured within a predetermined geographical area of each other may be carried out by using at least one of global positioning system (GPS) coordinates and wireless hotspot information; determining for each uncompressed image, the global positioning system (GPS) coordinates of a capture device that captured the image when the image was captured; and matching uncompressed images that were captured in closely related areas. For example, images captured within two feet of each other may be images of a similar scene and thus grouped together to take advantage of similar pixel data.

In the method of FIG. 3, selecting (204) from the plurality (220) of uncompressed images a group (226) of uncompressed images that have related contextual data includes selecting (304) uncompressed images that are captured with a capture device having a compass heading within a predefined range of compass headings. Selecting (304) uncompressed images that are captured with a capture device having a compass heading within a predefined range of compass headings may be carried out by determining for each uncompressed image, the compass heading of a capture device that captured the image when the image was captured; and matching uncompressed images that were captured at closely related compass headings. For example, images captured at a northern heading may be images of a similar scene and thus may be grouped together to take advantage of similar pixel data.

Figure 4:
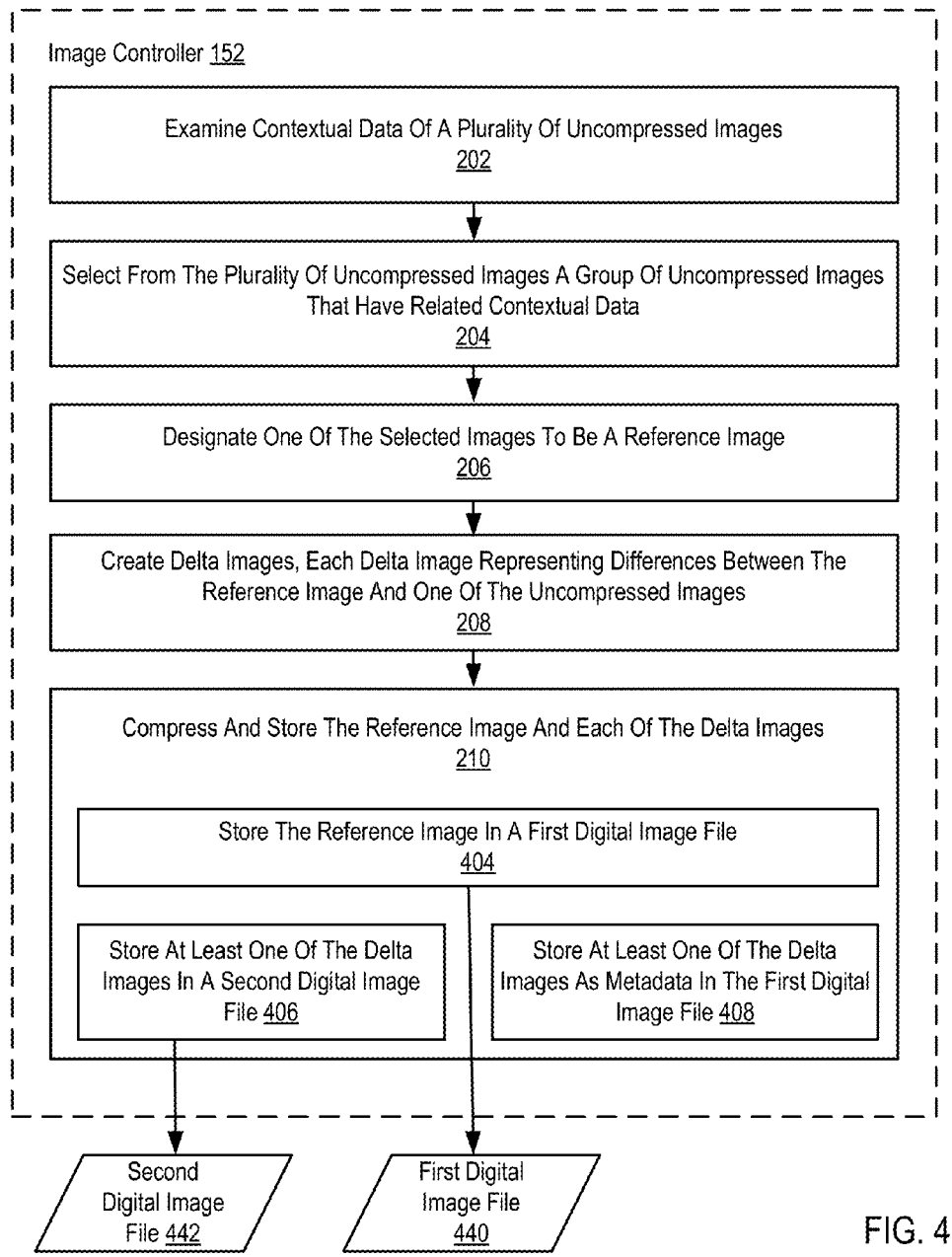
FIG. 4 sets forth a flow chart illustrating a further exemplary method for image compression according to embodiments of the present invention.

For further explanation, FIG. 4 sets forth a flow chart illustrating a further exemplary method for image compression according to embodiments of the present invention. The method of FIG. 4 is similar to the method of FIG. 2 in that the method of FIG. 4 includes: examining (202), by an image controller (152), contextual data (224) of a plurality (220) of uncompressed images; selecting (204) from the plurality (220) of uncompressed images, by the image controller (152), a group (226) of uncompressed images that have related contextual data; designating (206), by the image controller (152), one of the selected images to be a reference image (228); creating (208), by the image controller (152), delta images (230); and compressing and storing (210), by the image controller (152), the reference image (228) and each of the delta images (230).

In the method of FIG. 4, compressing and storing (210) the reference image (228) and each of the delta images (230) includes storing (404) the reference image (228) in a first digital image file (440). Storing (404) the reference image (228) in a first digital image file (440) may be carried out by storing the reference image (228) in memory within the image controller (152).

In the method of FIG. 4, compressing and storing (210) the reference image (228) and each of the delta images (230) optionally includes storing (406) at least one the delta images (230) in a second digital image file (442). Storing (406) at least one the delta images (230) in a second digital image file (442) may be carried out by storing the delta image within the image controller (152) in a file that is separate and distinct from the digital image file corresponding to the reference image (228).

In the method of FIG. 4, compressing and storing (210) the reference image (228) and each of the delta images (230) optionally includes storing (408) at least one the delta images (230) as metadata in the first digital image file (440). Storing (408) at least one the delta images (230) as metadata in the first digital image file (440) may be carried out by converting the delta image into parameters that can be stored as metadata; and storing the parameters within the digital image file corresponding to the reference image (228).

Figure 5:
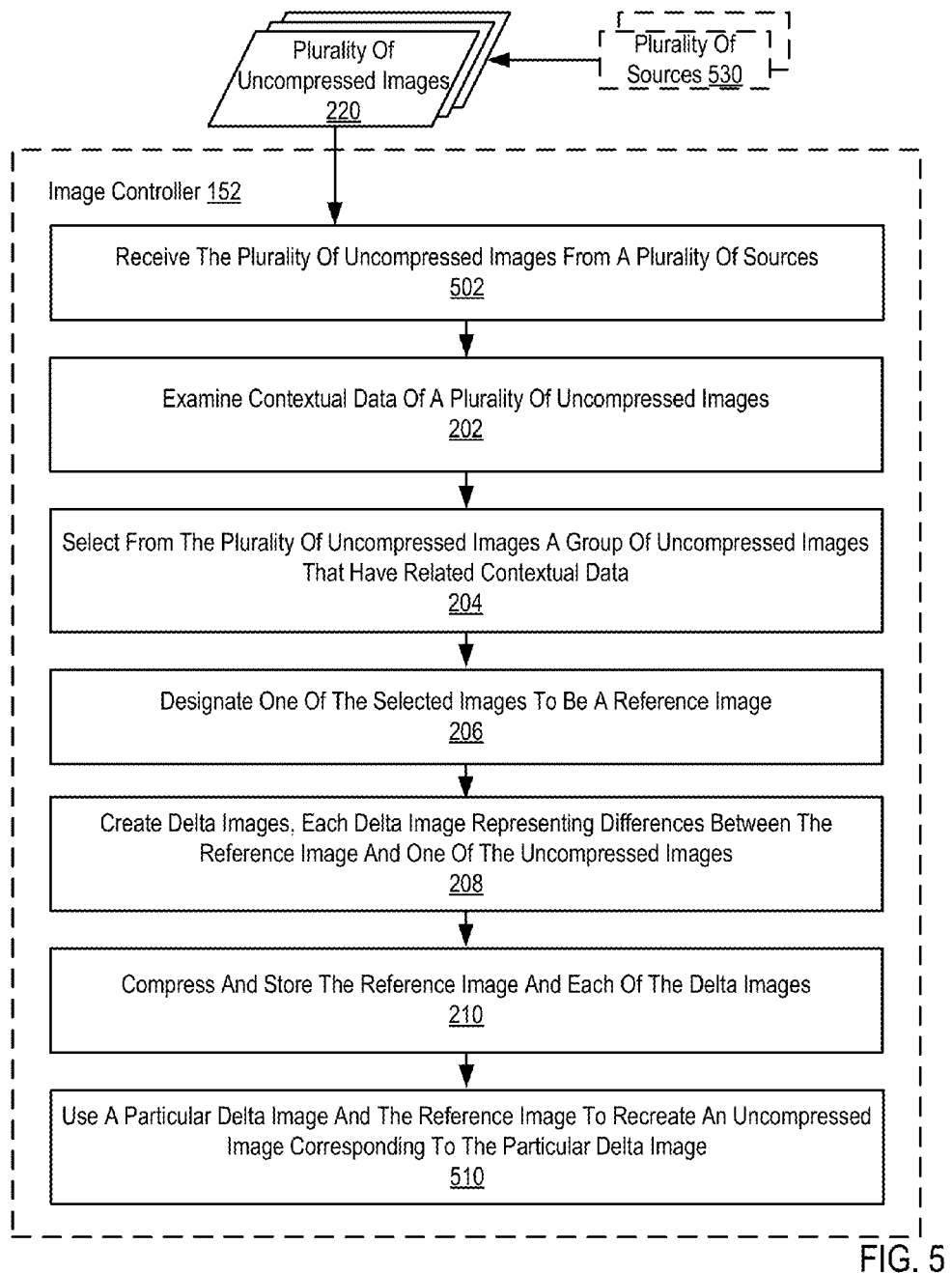
FIG. 5 sets forth a flow chart illustrating a further exemplary method for image compression according to embodiments of the present invention.

For further explanation, FIG. 5 sets forth a flow chart illustrating a further exemplary method for image compression according to embodiments of the present invention. The method of FIG. 5 is similar to the method of FIG. 2 in that the method of FIG. 5 includes: examining (202), by an image controller (152), contextual data (224) of a plurality (220) of uncompressed images; selecting (204) from the plurality (220) of uncompressed images, by the image controller (152), a group (226) of uncompressed images that have related contextual data; designating (206), by the image controller (152), one of the selected images to be a reference image (228); creating (208), by the image controller (152), delta images (230); and compressing and storing (210), by the image controller (152), the reference image (228) and each of the delta images (230).

The method of FIG. 5 includes receiving (502), by the image controller, the plurality (220) of uncompressed images from a plurality (530) of sources. Sources may include archives. For example, archived and compressed images on your hard drive may be examined to determine contextual information and metadata in the file. The identified contextual data may be used for image compression of the archived images according to embodiments of the present invention. After compressing the archived images, the archived images can be re-archived, now, with a smaller archive file size.

At least one of the uncompressed images of the plurality of uncompressed images is from a first source and at least one of the other uncompressed images is from a second source. Receiving (502) the plurality (220) of uncompressed images from a plurality (530) of sources may be carried out by receiving uncompressed images from a camera, or other type of device capable of storing images. For example, the image controller (152) may receive uncompressed images over a network connection. As another example, the image controller (152) may be a mobile device that is capable of receiving images from a camera but also from other users via a communications adapter over text message or email.

The method of FIG. 5 includes using (510), by the image controller, a particular delta image and the reference image (228) to recreate an uncompressed image corresponding to the particular delta image. Using (510) a particular delta image and the reference image (228) to recreate an uncompressed image corresponding to the particular delta image may be carried out by combining a particular delta image with the reference image (228). For example, if the delta image indicates that four pixels are different than the reference image (228), the four pixels within the reference image (228) are changed and the resulting image is stored as an uncompressed image. That is, decompressing all of the delta images with the reference image (228) results in the group (226) of uncompressed images.

Exemplary embodiments of the present invention are described largely in the context of a fully functional computer system for image compression. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of image compression, the method comprising:
examining, by an image controller, contextual data of a plurality of uncompressed images;
selecting from the plurality of uncompressed images, by the image controller, a group of uncompressed images that have related contextual data;
designating, by the image controller, one of the selected images to be a reference image;
creating, by the image controller, delta images, each delta image representing differences between the reference image and one of the uncompressed images; and
compressing and storing, by the image controller, the reference image and each of the delta images.

2. The method of claim 1 wherein the contextual data for a particular image is encoded as metadata with the particular image when the particular image is captured.

3. The method of claim 1 wherein selecting a group of images that have related contextual data includes selecting uncompressed images that are captured within a predetermined geographical area of each other.

4. The method of claim 1 wherein selecting a group of images that have related contextual data includes selecting uncompressed images that are captured with a capture device having a compass heading within a predefined range of compass headings.

5. The method of claim 1 wherein selecting a group of images that have related contextual data includes selecting uncompressed images that are captured within a predetermined geographical area of each other, wherein selected uncompressed images that are captured within a predetermined geographical area of each other includes using at least one of global positioning system (GPS) coordinates and wireless hotspot information.

6. The method of claim 1 further comprising receiving, by the image controller, the plurality of uncompressed images from a plurality of sources; wherein at least one of the uncompressed images of the plurality of uncompressed images is from a first source and at least one of the other uncompressed images is from a second source.

7. The method of claim 1 wherein compressing and storing the reference image and each of the delta images includes:
storing the reference image in a first digital image file; and
storing at least one the delta images as metadata in the first digital image file.

8. The method of claim 1 wherein compressing and storing the reference image and each of the delta images includes:
storing the reference image in a first digital image file; and
storing at least one the delta images in a second digital image file.

9. The method of claim 1 further comprising using, by the image controller, a particular delta image and the reference image to recreate an uncompressed image corresponding to the particular delta image.

10. Apparatus for image compression, the apparatus comprising a computer processor, a computer memory operatively coupled to the computer processor, the computer memory having disposed within it computer program instructions capable of:
examining, by an image controller, contextual data of a plurality of uncompressed images;
selecting from the plurality of uncompressed images, by the image controller, a group of uncompressed images that have related contextual data;
designating, by the image controller, one of the selected images to be a reference image;
creating, by the image controller, delta images, each delta image representing differences between the reference image and one of the uncompressed images; and
compressing and storing, by the image controller, the reference image and each of the delta images.

11. The apparatus of claim 10 wherein the contextual data for a particular image is encoded as metadata with the particular image when the particular image is captured.

12. The apparatus of claim 10 wherein selecting a group of images that have related contextual data includes selecting uncompressed images that are captured within a predetermined geographical area of each other.

13. The apparatus of claim 10 wherein selecting a group of images that have related contextual data includes selecting uncompressed images that are captured with a capture device having a compass heading within a predefined range of compass headings.

14. The apparatus of claim 10 wherein selecting a group of images that have related contextual data includes selecting uncompressed images that are captured within a predetermined geographical area of each other, wherein selected uncompressed images that are captured within a predetermined geographical area of each other includes using at least one of global positioning system (GPS) coordinates and wireless hotspot information.

15. The apparatus of claim 10 further comprising receiving, by the image controller, the plurality of uncompressed images from a plurality of sources; wherein at least one of the uncompressed images of the plurality of uncompressed images is from a first source and at least one of the other uncompressed images is from a second source.

16. A computer program product for image compression, the computer program product disposed upon a computer readable storage medium wherein the computer program product is not a signal, the computer program product comprising computer program instructions capable, when executed, of causing a computer to carry out the steps of:
examining, by an image controller, contextual data of a plurality of uncompressed images;
selecting from the plurality of uncompressed images, by the image controller, a group of uncompressed images that have related contextual data;
designating, by the image controller, one of the selected images to be a reference image;
creating, by the image controller, delta images, each delta image representing differences between the reference image and one of the uncompressed images; and
compressing and storing, by the image controller, the reference image and each of the delta images.

17. The computer program product of claim 16 wherein the contextual data for a particular image is encoded as metadata with the particular image when the particular image is captured.

18. The computer program product of claim 16 wherein selecting a group of images that have related contextual data includes selecting uncompressed images that are captured within a predetermined geographical area of each other.

19. The computer program product of claim 16 wherein selecting a group of images that have related contextual data includes selecting uncompressed images that are captured with a capture device having a compass heading within a predefined range of compass headings.

20. The computer program product of claim 16 wherein selecting a group of images that have related contextual data includes selecting uncompressed images that are captured within a predetermined geographical area of each other, wherein selected uncompressed images that are captured within a predetermined geographical area of each other includes using at least one of global positioning system (GPS) coordinates and wireless hotspot information.

* * * * *